United States Patent [19]

Derenbecher, Jr.

[11] 4,024,572
[45] May 17, 1977

[54] PAL ALTERNATE LINE COLOR PHASE DETECTOR

[75] Inventor: William Joseph Derenbecher, Jr., Cherry Hill, N.J.

[73] Assignee: RCA Corporation, New York, N.Y.

[22] Filed: Mar. 29, 1976

[21] Appl. No.: 671,561

[30] Foreign Application Priority Data
May 20, 1975  United Kingdom ............. 21549/75
Mar. 23, 1976  United Kingdom ............. 21549/75

[52] U.S. Cl. ............................................... 358/18
[51] Int. Cl.$^2$ ......................................... H04N 9/47
[58] Field of Search .................. 358/16, 17, 18, 19

[56] References Cited
UNITED STATES PATENTS

R28,823  5/1976  Coleman, Jr. ....................... 358/18

FOREIGN PATENTS OR APPLICATIONS 1,929,560  1970  Germany .............................. 358/18

Primary Examiner—Robert L. Richardson
Attorney, Agent, or Firm—E. M. Whitacre; M. DeCamillis

[57] ABSTRACT

The line-by-line R-Y component phase is detected by digital means directly from the composite video source, for example, the recorded composite video signal reproduced from a video tape recorder, and a continuous signal waveform at a two-line period is produced which indicates the instantaneous polarity of the R-Y component of each line of a PAL format video signal. The invention further provides for a positive elimination of the effect of spurious signals, such as dropouts, as well as compensating for the frame rate offset of the subcarrier employed in certain signal formats, such as PAL-B.

8 Claims, 8 Drawing Figures

PAL ALTERNATE LINE COLOR PHASE DETECTOR

BACKGROUND OF THE INVENTION

This invention relates to television signal synchronizing apparatus and especially to apparatus for synchronizing the television signals from two or more sources of video information; for example, two or more video tape recorders.

In monochrome TV, two separate sources of video information are considered phased together when their respective horizontal and vertical sync pulses are coincident, provided that for vertical sync first and second field sync is also observed. The basic repetition rate is therefore the picture field frequency divided by two, $f_V/2$. When two signals are so phased, cutting or fading from one source to the other can be carried out without disturbing the synchronization of receivers.

In the case of NTSC, the respective horizontal and vertical sync pulses of two video sources must, of course, be coincident, but, in addition, there is a further requirement in that the two color subcarrier frequencies must be phased together. In practice, this can be done by controlling the local subcarrier frequency with an APC loop which compares the bursts of the two subcarrier signals.

In PAL, the same coincidence of sync pulse and subcarrier phases must be made as in NTSC with the additional requirement that the PAL square wave $(f_H/2)$ of each signal source must also be in phase. The PAL standards, as defined by the CIRR standards, XII Plenary Assembly 1970, Vol. V, Part 2, Report No. 407-1 specify that the R-Y component of chroma be phase inverted on alternate television lines in synchronism with the PAL square wave. In the case where a PAL video source is not locked to a master PAL square wave as, for example, in a prerecorded video tape, it is necessary to know, on a continuous basis, the chroma designation of each line of the recorded PAL video signal as a positive R-Y or negative R-Y in order to synchronize the recorded PAL video signal chroma component to the master system reference $f_H/2$.

Known apparatus for detecting the line-by-line color phase requires the detection of a two-line component indicating the R-Y polarity in the error signal from a time base corrector which utilizes a reference subcarrier for comparison purposes. Alternatively, a resonant circuit tuned to the subcarrier and referenced to the leading edge of horizontal sync may be used to make the comparison with the line-by-line burst phase. The present invention eliminates the prior art necessity of a reference subcarrier-related signal for comparison.

SUMMARY OF THE INVENTION

A color burst phase detector is provided for developing a color burst switching signal at a two-line period from a phase alternate line (PAL) composite video signal which includes at least color burst and horizontal synchronizing components. The detector comprises a first source of signals, reversing in polarity every other television line, related to the color burst component from each line of the television signal. A source of periodic enabling signals in predetermined relation to said horizontal sync component, the enabling signals having a predetermined duration between loading and trailing edges. The detector further comprises first logic means responsive to the first signal source being enabled by the trailing edge of the enabling signals for providing a first output signal indicative of the polarity of the first signal, second logic means responsive to the first signal source being enabled by the leading edge of the enabling signals for providing a second signal indicative of the polarity of the second signal, and means responsive to coincident output signals from the first and second logic means for providing an output signal at the two-line period representative of the polarity of the burst phasing with respect to the horizontal synchronizing component.

DESCRIPTION OF THE INVENTION

Figure 1:
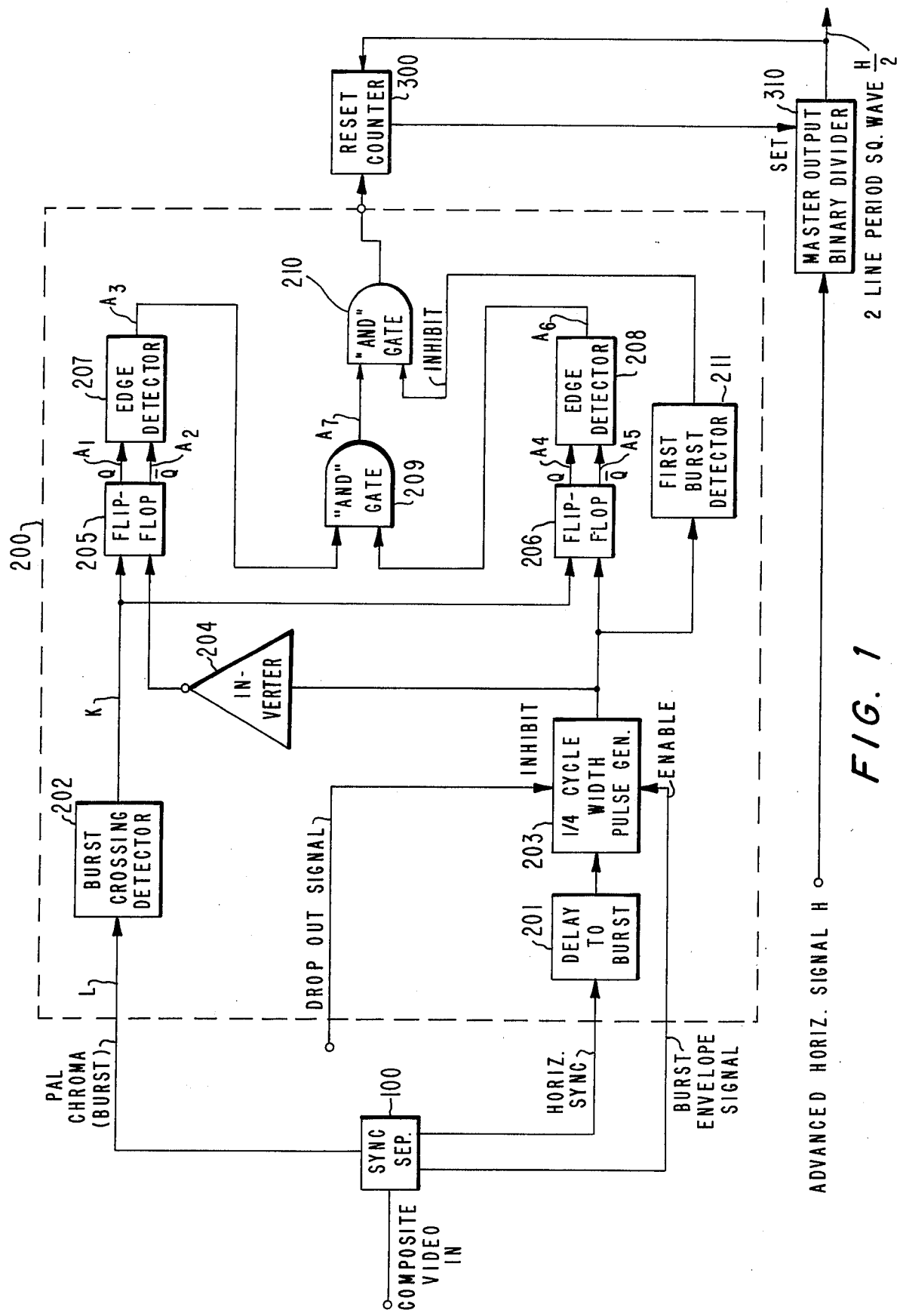
FIG. 1 is a block diagram of a PAL alternate line color phase detector according to the present invention.

In FIG. 1, a composite video signal is coupled to the input terminal of a sync separator 100, wherein the horizontal sync and burst components of the composite video source are separated in a known manner. Sync separator 100 also includes a burst envelope detector which may be in the form of a low-pass rectifier-filter so as to produce a burst envelope signal. The horizontal sync component is coupled to a delay circuit 201 which delays the leading edge of horizontal sync to occur within the burst interval, as illustrated, for example, in FIGS. 2E–2G which shows, for example, approximately three cycles of the burst signal K on each of television lines 1–6, 79–84, and 157–162 respectively. The delayed horizontal sync is, in turn, coupled to a pulse generator 203 which produces a pulse from the leading edge of the sync waveform and which has a duration of approximately ¼ cycle (90°) of the subcarrier frequency and which is illustrated, for example, by waveform E of FIG. 2E. The output pulse signal of pulse generator 203 is coupled to the clock terminal of flip-flop 206 and to the clock terminal of flip-flop 205 by means of an inverter 204. Flip-flops 205 and 206, which are of the form known as J-K flip-flops, are triggered by a positive-going edge, (by edges G and F of waveform E, FIG. 2E, respectively) approximately ¼ cycle of subcarrier apart during the burst interval.

The burst component (waveform K of FIG. 2E) from sync separator 100 is coupled to the input terminal of a burst crossing detector 202 in which each cycle of the sinusoidal burst waveform is amplified and limited to produce a squared wave (waveform L of FIG. 2E) with relatively sharply defined zero crossings at the subcarrier repetition rate. The output square wave of burst crossing detector 202 is coupled to the data input terminals of flip-flops 205 and 206.

Figure 2E:
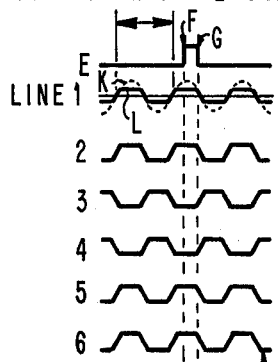
FIGS. 2A–2G illustrate waveforms depicting the operation of the apparatus of FIG. 1 in conjunction with a PAL signal format of 625 lines.
Figure 2F:
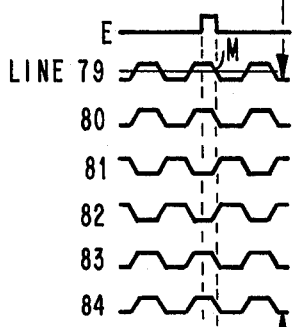
Figure 2G:
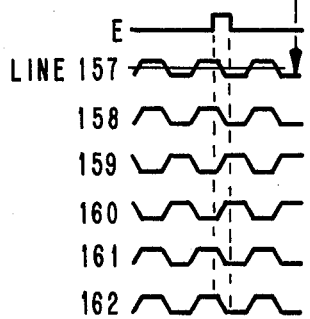
Figure 2A:
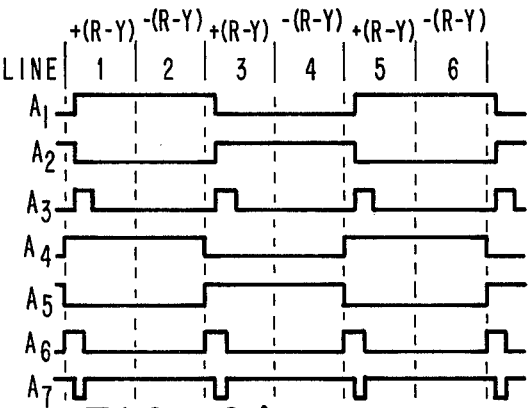

To better understand the operation of flip-flops 205 and 206 under the above-described condition, it will be helpful to review the present PAL standards with reference to the waveforms illustrated in FIGS. 2E and 2A. Present PAL standards specify the number of cycles of subcarrier per line to be an integer and either plus or minus ¼ cycle (90° of subcarrier). The burst on alternate lines is further specified as displaced plus and minus 45° from a vector referenced to the subcarrier phase. This reference vector also rotates 90° on every line from another vector referenced to horizontal sync.

The phase of the burst with respect to the horizontal sync therefore does not change between two lines in succession when the two 90° vector shifts are in a direction to cancel each other. When the two 90° vector shifts are in a direction to add to each other, a total shift of 180° occurs, and the phase of the burst with respect to the horizontal sync reference is inverted. This produces, as illustrated in waveforms line 1, 2, 3, 4, 5, 6 of FIG. 2E, two lines (1 & 2) with the same phase of burst and then two lines (3 & 4) with the opposite phase of burst; this two-line sequence repeating consecutively.

Since flip-flops 205 and 206 are arranged to change state only upon application of a positive edge at the clock input terminal, the output of flip-flops 205 and 206 will be square waves of two lines duration; i.e., lines 1 and 2 high and lines 3 and 4 low, as illustrated by waveforms $A_1$, $A_2$ and $A_4$, $A_5$ of FIG. 2A. The transition edges of the square wave output signal from flip-flops 205 and 206, representing the two-line component of the burst signal, are coupled to an input terminal of edge detectors 207 and 208 respectively. Edge detectors 207 and 208, which may be in the form of a differentiating network coupled to a Schmidt trigger, detect the signal transition of flip-flops 205 and 206 output signals without regard to polarity and provide at their output terminals respective signals identified as following edges and advanced edges which correspond to transitions G and F of waveform E in FIGS. 2E–2G. The output signals from edge detectors 207 and 208 represent the beginning of each television line of positive R-Y phase (waveforms $A_3$ and $A_6$ of FIG. 2A). The ouput signal of edge detectors 207 and 208 are coupled to input terminals of AND gate 209 which, in turn, produces an output waveform illustrated by waveform $A_7$ of FIG. 2A. The output of AND gate 209 is coupled to one input terminal of a false edge eliminator circuit 210, which may be in the form of an AND gate, and, in turn, to the input terminal of reset counter 300. A first burst detector 211, which may be in the form of a retriggerable monostable multivibrator, is coupled to another input terminal of the false edge eliminator AND gate 210. First burst detector 211 has its input terminal coupled to the output terminal of pulse generator 203, thus the first burst detector 211 is triggered by pulse generator 203 on each line in response to the burst signal on each line from sync separator 100. If the burst is missing, first burst detector 211 is not triggered, and its output inhibits the false edge eliminator AND gate 210 so as to eliminate the next burst edge from edge detectors 207 and 208, thereby preventing an output signal from detector 200 which may not be properly line designated, for example, in the event of a video tape signal dropout to be described in detail below.

In a typical broadcast studio operation where, for example, a composite video signal from a tape recording is to be synchronized with an existing video signal, an advanced horizontal reference signal H is coupled to an output binary divider 310 which develops at its output a signal H/2. This is the two-line period square wave commonly referred to as the PAL Square Wave. In operation, the polarity of this PAL square wave output H/2 rate must agree with the two-line period phasing of the R-Y component of the chroma recorded on the video tape recording if proper synchronization is to occur. The output of the detector 200, which represents the instantaneous line-by-line polarity; i.e., a positive R-Y component, is compared with the polarity of the H/2 output of the master binary divider 310 in reset counter 300. If the polarities differ, reset counter 300 provides a set pulse which is used to correct the polarity of the PAL square wave from the master output binary divider 310 whenever the master binary divider 310 output does not agree with the polarity of the R-Y component of the chroma of the recorded video signal.

Figure 2B:
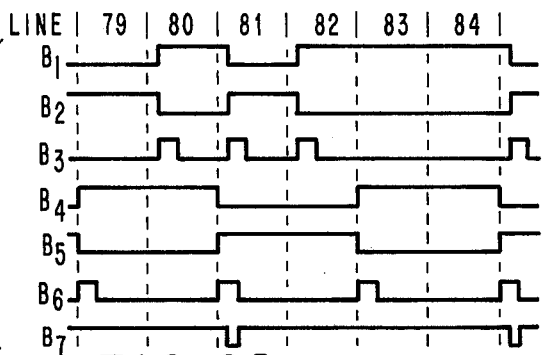

To further illustrate the flexibility of the present invention, the operation of burst polarity detector 200 in conjunction with a variation of the PAL standards known as PAL-B will be described. In a PAL-B system, which contains a frame rate offset in the subcarrier, the squared burst interval signal coupled to the data inputs of flip-flops 205 and 206 slowly drifts with respect to the horizontal sync represented by the clock input (waveform E) to the flip-flops 205 and 206. This is illustrated in FIGS. 2E, 2F and 2G which shows how the subcarrier phase position with respect to the horizontal sync related pulse, waveform E, varies as the horizontal lines of the television signal progress in accordance with the frame rate offset. In FIG. 2E, the polarity of the subcarrier, represented by waveform L, is shown as the same with respect to clock pulse edges F and G for horizontal lines 1–6, as the subcarrier continues to drift, for example, the 45° of subcarrier phase indicated between line 6 of FIG. 2E and line 79 of FIG. 2F and the 45° of subcarrier phase between line 84 of FIG. 2F and line 157 of FIG. 2G, the polarity of subcarrier is seen to seem to change from identical polarity at edges F and G to differing polarity in FIG. 2G. The subcarrier drift continues to progress in this manner throughout the horizontal lines constituting the picture frame. At some time, the clock edge G of waveform E, FIG. 2F, for example, will occur too close to a data input trigger point (M on waveform line 79 of FIG. 2F) which may result in a false or random output from the associated flip-flop 205, as illustrated by waveforms $B_1$ and $B_2$ of FIG. 2B. The inclusion of AND gate 209 prevents such an occurrence from creating a false edge (waveform $B_3$ of FIG. 2B) by not providing an output signal from AND gate 209 unless the edge signal from one flip-flop is coincident with an edge signal from the alternate flip-flop. This is illustrated in waveform $B_7$ of FIG. 2B which shows erratic edge information eliminated. Since waveform $B_7$ is used to reset the master output binary 310 by means of reset counter 300, the elimination of erratic pulses does not alter the status of the master binary 310; i.e, only correctly determined edges (waveform $B_7$ of FIG. 2B) are allowed to influence to master binary.

Figure 2C:
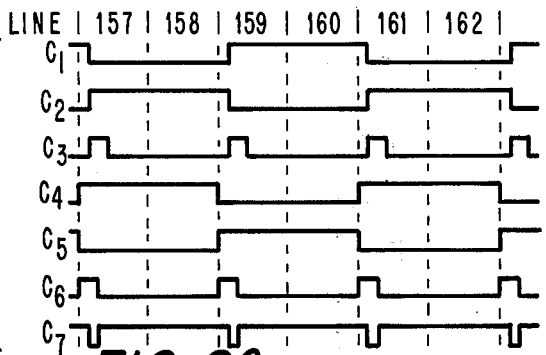

As the drift due to subcarrier offset continues and the clock pulse remains fixed (waveform E of FIGS. 2E, 2F, 2G), the burst polarity to the data inputs of the flip-flops 205 and 206 will reverse their respective polarity. This condition is illustrated in the waveforms of FIGS. 2G and 2C; however, the output signal of AND gate 209 (waveform $C_7$ of FIG. 2C) maintains a signal output corresponding to the beginning of a positive R-Y burst polarity at the desired two-line rate since it is the transitions of the signal outputs of flip-flops 205 and 206 which determine the two-line period.

Figure 2D:
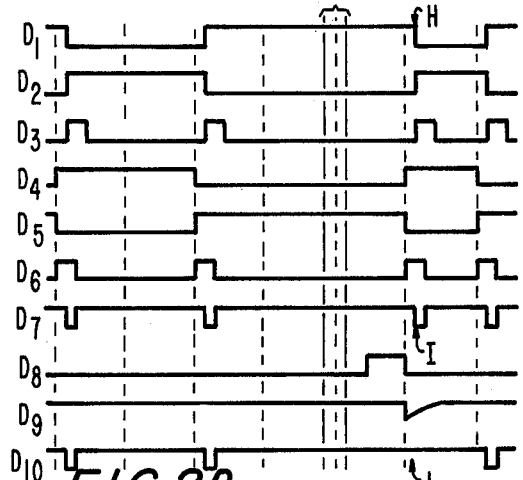

To further desensitize the apparatus of detector 200 of FIG. 1 in the presence of noise and erratic signal information accompanying the input composite video signal, several additional circuits are included in the apparatus of FIG. 1. The first of these is a burst envelope signal which is shown coupled to a terminal of the ¼ cycle pulse generator 203. In the absence of a burst signal for a particular line, the burst envelope signal will not be present and pulse generator 203 will not be enabled, thereby not developing a clock signal, and preventing flip-flops 205, 206 and edge detectors 207, 208 from developing an output in the absence of a burst interval. As previously described, the master binary 310 continues to function over this period. It is also desirable, particularly where the composite video signal is derived from a recorded tape, to desensitize the detector 200 in the event a dropout of the signal occurs. In the event of a signal dropout, a dropout signal developed in a known manner from the dropout compensator circuits of the video tape recorder is coupled to an input terminal of pulse generator 203 to again inhibit the flip-flops 205 and 206 from generating a false or random output. This is illustrated in the waveforms $D_1$, $D_2$ of FIG. 2D. Since the dropout may be of varying time duration, it is necessary to prevent the generation of an output from detector 200 at the next transition as this transition is not necessarily line defined. To prevent the generation of an output from detector 200, the burst following a dropout signal is detected by first burst detector 211. First burst detector 211 comprises a retriggerable monostable multivibrator having a time constant of approximately 1½ lines coupled to a differentiator. So long as this multivibrator is retriggered within each line by the pulse from pulse generator 203, the output of the differentiator has no effect. However, as illustrated in waveform $D_8$ of FIG. 2D, when the multivibrator is retriggered by the first burst after a one-line time period, the output of the differentiator (waveform $D_9$) inhibits the false edge eliminator AND gate 210 so as to eliminate the first edge developed after the dropout (waveform I of FIG. 2D). False edge eliminator 210 may be in the form of an AND gate arranged to pass the edge signal in the absence of an inhibit signal from first burst detector 211. In this arrangement, the first burst detector, being retriggered on each line, will allow the developed edge signal from AND gate 209 to pass. If the first burst edge detector is not retriggered on each line, as may occur when a dropout is detected, then the output of the first edge detector 211 changes state and prevents the false edge signal from reaching the reset circuit 300. Therefore, waveform $D_{10}$ of FIG. 2D represents the output of false edge eliminator 210 when a dropout is detected. Again, as previously described in conjunction with the waveforms of FIGS. 2A, 2B and 2C, the master binary 310 continues to develop the PAL square wave without interruption or false resetting.

The operation of the apparatus of FIG. 1 may be still further desensitized and stabilized in the presence of very noisy signals by including in reset circuit 300 a counter circuit that allows the master binary 310 to be reset only after several edges have occurred. The counter circuit may, for example, be in the form of a bi-directional shift register that provides a set pulse only when each out-of-phase edge is not cancelled later by an in-phase edge for a net number of out-of-phase edges counts equal to a preset number, for example, four out-of-phase edges may be selected as representing a decision to change the phasing status of the master binary 310 output.

What is claimed is:

1. A color burst phase detector for developing a color burst switching signal at a two-line period from a phase alternate line (PAL) composite video signal, said composite video signal including at least color burst and horizontal synchronizing components, said detector comprising:
    a first source of signals related to said color burst component from each line of said television signal, said signal reversing in polarity every other one of said lines;
    a source of periodic enabling signals in predetermined relation to said horizontal sync component, said enabling signals having a predetermined duration between leading and trailing edges;
    first logic means responsive to said first signal source, said first logic means being enabled by the trailing edge of said enabling signals for providing a first output signal indicative of the polarity of said first signal;
    second logic means responsive to said first signal source, said second logic means being enabled by the leading edge of said enabling signals for providing a second signal indicative of the polarity of said first signal; and
    output means responsive to coincident output signals from said first and second logic means for providing an output signal at said two-line period representative of the polarity of the burst phasing with respect to said horizontal synchronizing component.

2. A color burst phase detector according to claim 1 wherein said first and second logic means comprise J-K flip-flops.

3. A color burst phase detector according to claim 2 wherein said output means comprises:
    first detection means responsive to a change in polarity of said first signal output for developing a third output signal;
    second detection means responsive to a change in polarity of said second signal output developing a fourth output signal; and
    combining means responsive to said third and fourth output signals for providing a final output signal at a two-line period representative of the polarity of the burst phasing with respect to said horizontal synchronizing component.

4. A PAL square wave generator for developing a two-line period square wave synchronized to a system reference signal from a PAL composite video signal including at least color burst and horizontal synchronizing components, comprising;
    a color burst detector for developing a color burst switching output signal at a two-line period representative of the polarity of the burst phasing with respect to said horizontal component;
    master reference signal divider means responsive to said system reference for developing a two-line period square wave related to said system reference signal; and
    reset counter means coupled to said master divider means and responsive to said detector switching output signal for synchronizing said two-line period square wave to said two-line period signal representative of the polarity of the burst phasing.

5. A PAL square wave generator according to claim 4 wherein said color burst detector comprises:
    a first source of signals related to said color burst component from each line of said television signal, said signal reversing in polarity every other one of said lines;

a source of periodic enabling signals in predetermined relation to said horizontal sync component, said enabling signals having a predetermined duration between leading and trailing edges;

first logic means responsive to said first signal source, said first logic means being enabled by the trailing edge of said enabling signals for providing a first output signal indicative of the polarity of said first signal;

second logic means responsive to said first signal source, said second logic means being enabled by the leading edge of said enabling signals for providing a second signal indicative of the polarity of said first signal; and means responsive to coincident output signals from said first and second logic means for providing an output signal at said two-line period representative of the polarity of the burst phasing with respect to said horizontal synchronizing component.

6. A color burst phase detector according to claim 5 wherein said first and second logic means comprise J-K flip-flops.

7. A color burst phase detector according to claim 6 wherein said output means comprises:

first detection means responsive to a change in polarity of said first signal output for developing a third output signal;

second detection means responsive to a change in polarity of said second signal output developing a fourth output signal; and combining means responsive to said third and fourth output signals for providing a final output signal at a two-line period representative of the polarity of the burst phasing with respect to said horizontal synchronizing component.

8. A PAL square wave generator according to claim 7 wherein said reset counter means includes a shift register for providing a synchronizing reset output signal in response to a pre-selected number of out-of-phase detector switching signals.

* * * * *